United States Patent Office 2,882,251
Patented Apr. 14, 1959

2,882,251

INTERPOLYMERS OF VINYL HALIDES ETHYL-ENICALLY UNSATURATED ESTERS AND GLYCIDYL POLYETHERS

Roger M. Christenson, Whitefish Bay, Wis., assignor to Pittsburgh Plate Glass Company, Pittsburgh, Pa., a corporation No Drawing. Application November 20, 1953
Serial No. 393,494

5 Claims. (Cl. 260—23)

This invention relates to the preparation of soluble interpolymers having valuable properties as protective or coating materials for solid surfaces and it has particular relation to the preparation of interpolymers, which when spread as liquid films are adapted quickly to set to a hard durable state by air drying or baking at elevated temperatures.

It has heretofore been suggested to form polymers of vinyl type halides containing the group

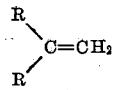

where a single group R is halogen such as chlorine or bromine, and the other is hydrogen or hydrocarbon such as methyl or ethyl. From a practical standpoint, vinyl chloride

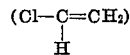

has been the most successful member of the class. The products of homopolymerization are highly chemically resistant, but are insoluble and are lacking in plasticity, and often are lacking in stability and other desirable properties.

In an attempt to obviate these characteristics of vinyl halide polymers, interpolymers have also been prepared from the vinyl halides and other monomers containing a >C=CH₂ group, usually linked to a negative group or radical and being capable of interlinking with or at least of concurrently polymerizing with vinyl halide. Of the various monomers which have thus been paired with vinyl halides, vinyl acetate is probably the most successful, but others including, vinylidene chloride, acrylic acid and acrylic esters, acrylonitrile, vinyl alkyl ethers, styrene, 2-chlorallyl acetate, allyl acetate, and others are capable of interpolymerization with vinyl halides, at least to a considerable degree. These products however, are often of limited solubility in most solvents, especially less expensive ones, such as hydrocarbons and for that reason the material is relatively expensive for use as a coating medium.

It has also been suggested to prepare glycidyl polyethers of the general formula:

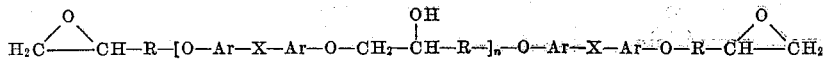

where R and X are aliphatic hydrocarbon groups and Ar is an aryl group. These glycidyl polyethers can be hardened by a baking operation. However, the operation is relatively slow.

This invention comprises the discovery that mixtures of the foregoing vinyl halides containing a single halogen atom on a carbon atom of the group >C=CH₂ and other monomers interpolymerizable therewith, can successfully be interpolymerized with esters of glycidyl polyethers to provide resins having many of the virtues, at least to a substantial degree, of the interpolymers of vinyl halides and added monomers such as the esters containing a >C=CH₂ group, but which are soluble in relatively cheap hydrocarbon solvents such as xylene or toluene. The resultant solutions are adapted for application to surfaces of solid bodies to form films which can be dried very rapidly by air or by baking to provide valuable decorative or protective coatings of good chemical resistance and other useful properties.

Glycidyl polyethers which can be esterified with a fatty acid such as is obtained from soya oil, linseed oil or the like to provide products which can be further interpolymerized with monomer pairs, one of which is a vinyl halide as previously described and the other contains a >C=CH₂ group and forms interpolymers therewith, can readily be prepared from a relatively wide variety of dihydric or polyhydric phenolic compounds. Probably one of the best and least expensive of these is p,p'-isopropylidene diphenol already referred to which can be obtained as a commercial product known as Bisphenol A. This compound can readily be reacted with epichlorohydrin in the presence of an alkali such as sodium hydroxide to form glycidyl polyether compounds. Other dihydroxy or polyhydroxy compounds may similarly be reacted with epichlorohydrin. A partial list of appropriate polynuclear phenols for use in the practice of the present invention includes such compounds as p,p'-isopropylidenediphenol, above referred to; 4,4'dihydroxy benzophenone; bis(4-hydroxyphenyl) 1,1-ethane; bis(4-hydroxyphenyl) 1,1-isobutane; bis(4-hydroxyphenyl) 2,2-butane; bis(4-hydroxy 2-methyl phenyl) 2,2-propane; bis(4-hydroxy 2-tertiary butyl phenyl) 2,2-propane; bis (2-dihydroxy naphthyl) methane; 1,5-dihydroxy naphthalene and others. Other polynuclear phenols which are free of reactive groups other than the hydroxyl groups of the phenol and which might tend to complicate the reaction may be employed.

The p,p'-isopropylidene diphenol or any of the other polynuclear phenol compounds above listed or their equivalents can be reacted with various halogen substituted epoxy compounds of which epichlorohydrin constitutes an example. A partial list of such compounds includes 1-chloro-2,3-epoxy butane; 1-chloro-3,4-epoxy butane; 2-chloro-3,4-epoxy butane; 1-chloro-2-methyl 2,3-epoxy butane; 1-bromo-2,3-epoxy pentane; 2-chloro methyl-1,2-epoxy butane; 1-bromo-4-methyl-3,4-epoxy pentane; 1-bromo-4-ethyl 2,3-epoxy pentane; 4-chloro-2-methyl-2,3-epoxy pentane; 1-chloro-2,3-epoxy octane; 1-chloro-2-methyl 2,3-epoxy octane; and 1-chloro-2,3-epoxy decane. Of these various epoxy compounds, epichlorohydrin because of general commercial availability and relatively low cost, is usually preferred.

Many glycidyl polyethers of polyhydric phenol compounds have been described in prior patents and other literature, and may be employed in the practice of the present invention.

Examples of glycidyl polyethers contain free epoxy or hydroxy groups and which may be esterified with fatty acids and notably the unsaturated fatty acids such as those of semi-drying oils, which esters then can be interpolymerized with mixtures of halides and esters containing >C=CH₂ groups are contained in such U.S. patents as the following:

2,592,560
2,506,486
2,464,758
2,302,363
2,060,715

While the foregoing glycidyl polyethers of the polyhydric phenol compounds may be readily prepared by techniques available such as are disclosed in the patent, it is to be understood that such ethers are already available as commercial products in considerable variety and from several sources. These available products may be employed for esterification with higher fatty acids to provide esters suitable for use in the practice of this invention. For example, such glycidyl polyethers of bis (hydroxyphenyl) alkanes and epichlorohydrin as are sold by the Shell Chemical Company under the trade name of Epon Resins or by the Ciba Corporation under the trade name of Araldite Resins may be employed. In the several examples which are subsequently to follow these commercial products are employed. However, many other esterifiable glycidyl polyethers of a polyhydroxyl phenol compound such as a dihydric diphenyl substituted alkane may be employed. Such glycidyl polyethers may be prepared by appropriate techniques. Typical glycidyl polyether which are within the formula, and which are available as commercial products are:

|           | Epoxide Equivalency | Melting Point [1] |
|-----------|---------------------|-------------------|
| Epon 1001 | 450 to 525          | 64–76             |
| Epon 1004 | 905 to 985          | 97–103            |

[1] Durans mercury method.

Fatty acids suitable for esterifying the glycidyl polyethers are from glyceride oils such as soya oil, linseed oil, dehydrated castor oil, cottonseed oil and others. These acids contain 18 carbon atoms in the chain. Usually, they are mixtures of acids, some of which contain double bonds and usually some contain a plurality of double bonds. Pure acids could also be employed if desired.

Those products of the type represented by the formula:

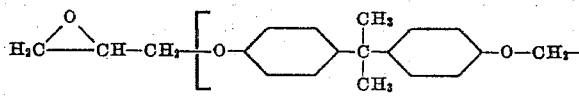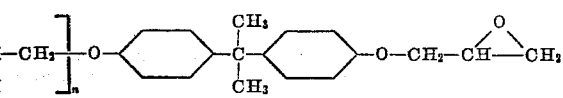

where $n$ is a whole number such that the epoxide equivalency in grams of resin per equivalent of epoxide is about 400 to 1000 are highly useful in forming esters with higher fatty acids for interpolymerization with mixtures of the halogen substituted monomers and the ester monomer in accordance with the provisions of this invention. The acids usually are employed in amount less than the hydroxy equivalency of the glycidyl polyether resin.

In selecting halogenated monoolefinic compounds suitable for incorporation with the other components of the interpolymers herein disclosed, a special emphasis is placed upon vinyl chloride. This compound is relatively inexpensive and quite reactive with the other components. It greatly increases the hardness, chemical resistance and durability of the product. However, it is to be understood that other halogenated monoolefinic compounds, where there is but a single halogen atom on a carbon atom of the ethylenic group, may be substituted for vinyl chloride in whole, or in part and interpolymerized with the other monomers and the glycidyl polyethers, thus to provide useful coating compositions and other interpolymers. Thus the invention includes replacement of vinyl chloride by the corresponding bromide or 2-chloropropene, or the like.

The monomers useful for incorporation with the vinyl halides and glycidyl polyethers to provide useful soluble interpolymers may be selected from those groups and classes already mentioned as being appropriate for pairing with vinyl halides. Such classes include the ethers containing the group $>C=CH_2$ and comprising vinyl ethyl n-butyl ether, vinyl isobutyl ether, 2-ethyl hexyl vinyl ether, methoxy-methoxyethyl vinyl ether, and others. Other monomers from which selection may be made for interpolymerization with the vinyl halides and the glycidyl polyethers include: vinylidene chloride, acrylonitrile, styrene, isobutylene, acrylamide, methacrylamide, acrylic acid, methacrylic acid and more especially the carboxylic acid esters containing a $>C=CH_2$ group.

Ester monomers suitable for use in the interpolymer products of this invention are outstandingly represented by vinyl acetate, but are by no means limited thereto, since the invention includes the use of other esters containing a $>C=CH_2$ group and being represented by vinyl propionate, vinyl butyrate, vinyl isobutyrate, methyl methacrylate, ethyl methacrylate, propyl methacrylate, methyl acrylate, ethyl acrylate, vinyl alpha-chloroacetate, vinyl alpha-bromoacetate, diallyl maleate, 2-chloroallyl acetate, allyl acetate, and others. These monomer esters may be mixed with other monomers in appropriate amounts, for example, 1 to 20 percent by weight based upon the monomer mixture, of other monomers containing $>C=CH_2$ groups, and being represented by the nitriles such as acrylonitrile, methacrylonitrile, acrylamide, methacrylamide, acrylic acid, methacrylic acid, isobutylene, styrene, alpha-methylstyrene, and others.

Other ester monomers such as alkyl maleates, fumarates, crotonates, and related esters could be used as components of the system.

In preparing mixtures of monomers such as vinyl acetate and vinyl chloride for use in accordance with the provisions of the present invention, substantial variations of proportions of the two monomers with respect to each other are contemplated as being within the scope of the invention. Very good products may be obtained by employing equal parts by weight of vinyl acetate and vinyl chloride or the equivalents thereof. However, monomer mixtures containing from 5 to about 80 percent by weight of vinyl chloride, the rest of the mixture being vinyl ester are contemplated as being within the scope of the invention.

The preparation of esters of fatty acids and glycidyl polyethers of dihydric phenols for use in the practice of the present invention is illustrated by the following examples:

EXAMPLE A

In this example a reactive mixture was prepared comprising 500 grams of a commercial glycidyl polyether of bis(4-hydroxyphenyl) propane of an epoxide equivalency of 450 to 525 and a melting point of 64°–76° C. known as Epon 1001 and 500 grams of fatty acids of soya oil were placed in a 3-necked flask equipped with an agitator, a water separator and a thermometer. Xylene in an amount to provide a reflux was added and the mixture was esterified at 100° C. under reflux for 6 hours. The resultant ester product when diluted to a solids content of 49.9 percent by weight had a viscosity of A to B, a Gardner color of 10 to 11 and an acid number of 4. This product was suitable for interpolymerization with vinyl acetate and vinyl chloride or their equivalents in accordance with the provisions of this invention. In this and subsequent examples viscosities are upon the Gardner-Holdt scale.

EXAMPLE B

In accordance with this example, 560 grams of fatty acids of soya oil and 312 grams (2.4 hydroxyl equivalents) of the glycidyl polyether of Example A was employed in the same manner as in Example A. The reaction was continued for 10 hours at the conclusion of which time, a product having a viscosity of $Z_1$ when it was diluted to provide a solution of 90.1 percent by weight solids, was obtained. The Gardner color was 12 to 13 and the acid number was 25.2.

EXAMPLE C

In this example the procedure of Example A was employed except that a commercial glycidyl polyether of the preceding formula and of an epoxide equivalency of 905 to 985 and sold as Epon 1004 was employed. The properties of the ester product were as follows:

| | |
|---|---|
| Percent solids | 50.7 |
| Viscosity | C |
| Gardner color | 8 to 9 |
| Acid number | 8.8 |

These determinations were made in xylene.

EXAMPLE D

This example constitutes an illustration of operation upon a larger scale. The charge comprised 20 pounds of glycidyl polyether of an epoxide equivalency of 450–525 and a melting point of 64–76 (Epon 1001), 20 pounds soya fatty acids and 4.5 pounds of xylene. These were introduced into an 8 gallon stainless steel reactor and esterification was effected at 200° C. over a period of 6 hours. The product was diluted with xylene to a solids content of 58.6 at which concentration it had a viscosity of E, a Gardner color of 10 to 11 and an acid number of 5.6.

EXAMPLE E

In this example the charge comprised 1200 grams of the glycidyl polyether of p,p'-isopropylidenediphenol of an epoxide equivalency of 905–985 and a melting point of 97–103 and 1200 grams soya fatty acids. Xylene was added and the mixture was refluxed in accordance with Example A to provide a product of the properties:

| | |
|---|---|
| Percent solids | 57.4 |
| Viscosity | C to D |
| Gardner color | 10 to 11 |
| Acid number | 5.9 |

EXAMPLE F

The charge again comprised 1200 grams of the glycidyl polyether resin of Example A and 1200 grams soya fatty acids. Xylene was added and the mixture was refluxed as in Example A to provide a product of the properties:

| | |
|---|---|
| Percent solids | 77.5 |
| Viscosity | X to Y |
| Gardner color | 10 to 11 |
| Acid number | 6.7 |

EXAMPLE G

In this example the glycidyl polyether resin was the same as in Example C; 500 grams of this resin, 500 grams of linseed oil fatty acids and a small amount of xylene sufficient to provide a reflux were introduced into a 3-necked flask and heated with agitation at 200° C. for a period of 6 hours. A portion of the solvent was then distilled to provide a composition of the properties:

| | |
|---|---|
| Percent solids | 74.0 |
| Acid number | 8.4 |
| Gardner color | 9 to 10 |

It is to be understood that in each of the Examples A through G, the commercial glycidyl polyether could be replaced by other commercial products such as the Araldites or other commercial or non-commercial products.

These esters of the glycidyl polyethers can be mixed with monomers such as vinyl chloride and vinyl acetate or their equivalents in accordance with the present invention in varying amounts. The precise minimum and maximum are difficult to state since these values will vary with different compositions and for different applications. A range of about 10 to about 46 percent by weight of the ester of the glycidyl polyether, the rest of the interpolymerizable mixture being monomers, is suggested. However, numerous important products have been prepared from mixtures comprising approximately 20 percent by weight of the glycidyl ether polyester, the rest being monomers.

Since vinyl chloride is relatively volatile, it is desirable to conduct the reaction under pressure in a suitable apparatus such as an autoclave, a closed kettle or the like. It is to be understood that such apparatus was employed in conducting the interpolymerizations in the examples to follow.

In preparing interpolymers of esters of glycidyl polyethers and mixed monomers in accordance with the provisions of the present invention, it is desirable to include a catalyst of the free radical type and being represented by benzoyl peroxide, tertiary butyl peroxide, tertiary butyl hydroperoxide, cumene hydroperoxide, lauroyl peroxide, ammonium persulfate, and others.

If desired, inhibitors of discoloration such as RN34 (a commercial glycidyl polyether of low molecular weight) or XB12 (a commercial stabilizer understood to be tin laurate) may be added in small stabilizing amounts.

It is an advantage of this invention that interpolymerizations of the esters of glycidyl polyethers and monomers such as vinyl acetate and vinyl chloride (mixed) may be conducted at relatively low temperatures, for example, about 70° or 75° C. However, substantially higher temperatures below the decomposition temperature of the reactants or their products may be employed. A range of about 70° to 100° C. is suggested. The reaction is continued until a desired viscosity or a desired acid number is attained, as can readily be determined by subjecting small samples of the reaction product to viscosity tests, tests for acid number, or other conventional tests in well known manner as the reaction proceeds. In any event, the reaction should be discontinued before gelation or decomposition of the reaction products takes place. At the end of the reaction, excess monomers and any other volatile material are distilled and the product is diluted with xylene or toluene to desired viscosity.

The preparation and testing of interpolymers of esters of fatty acids and glycidyl polyethers prepared as previously described in Examples A through G inclusive, with vinyl acetate and vinyl chloride in accordance with the provisions of the present invention is illustrated by the following examples.

EXAMPLE I

In this example the ester of the glycidyl polyether was prepared in accordance with the provisions of Example A. A series of samples was made up with this material as one component in which the several components were varied:

Sample 1 comprised:

| | Parts by weight [1] |
|---|---|
| Glycidyl polyether ester (A) | 20 |
| Vinyl acetate | 30 |
| Vinyl chloride | 10 |
| Catalyst (benzoyl peroxide) | 0.75 |

[1] Parts by weight of glycidyl polyether ester in this and subsequent examples are in terms of the solutions of ester in xylene.

The mixture was interpolymerized at 75° C. for a period of 15 hours. The excess monomers were distilled and the product was diluted with xylene. The product, at 45.4 percent by weight solids in xylene, had a viscosity of O to P and a Gardner color of 10 to 11. The combined monomer content of the polymer was 61.8 percent by weight.

Sample 2 comprised:

| | Parts by weight |
|---|---|
| Glycidyl polyether ester (A) | 20 |
| Vinyl acetate | 30 |
| Vinyl chloride | 20 |
| Benzoyl peroxide as a catalyst | 1 |

This mixture was interpolymerized at 75° C. for 15 hours. The unreacted monomers were distilled. The product at a solids content of 54.8 percent in xylene had a viscosity of $Z_3$ to $Z_4$, and a Gardner color of 9 to 10. The combined monomer content of the polymer was 70.8 percent.

Sample 3 comprised:

| | Parts by weight |
|---|---|
| Glycidyl polyether ester (A) | 20 |
| Vinyl acetate | 20 |
| Vinyl chloride | 20 |

This mixture was catalyzed with 0.75 part by weight of benzoyl peroxide and the mixture was interpolymerized at 75° C. for 15 hours to provide a product from which the excess monomer was distilled. The resin when diluted with xylene to a solids content of 44.8 percent by weight, had a viscosity of M and a color of 12 to 13 on the Gardner scale. The combined monomer content of the resin was 61.5 percent.

Sample 4 was similar to Sample 3, but the benzoyl peroxide content was 1 part by weight. The mixture was interpolymerized for 15 hours at 75° C., the excess monomers were distilled and the resin, when diluted with xylene to a solids content of 48.4 had a viscosity of X to Y and a Gardner color of 16 to 17. The combined monomer content of the resin was 65.6 percent by weight.

Sample 5 comprised:

| | Parts by weight |
|---|---|
| Glycidyl polyether ester (A) | 20 |
| Vinyl acetate | 10 |
| Vinyl chloride | 30 |
| Benzoyl peroxide | 0.75 |

The time cycle was 15 hours at 75° C. The excess monomers were distilled and the resin was diluted to a solids content of 40.9 percent by weight with xylene, at which it had a viscosity of L, and a Gardner color of 15. The combined monomer content of the resin was 57.8 percent.

Each of the samples was then spread to provide films upon test panels of glass and of steel and the air drying speed, the Sward hardness and the flexibility of the films were determined with conventional tests. The drying speed tests comprised "set," which is the time in minutes required for the film material to air dry to such state that it no longer adheres as a liquid to the finger; "cotton free," which is determined as the time in minutes required for the film to set to such state that cotton fibers do not adhere thereto when pressed thereagainst; "print free," which is the time in minutes required for the film to set to such degree that newspaper print does not adhere to or mark the film.

Alkali resistance, which is a measure of chemical resistance, was also determined.

The results of these several tests for each of the samples is tabulated as follows:

| Sample | Drying Speed (Min.) | | | Hardness | | Flexibility, Percent | Alkali Resistance, Hours |
|---|---|---|---|---|---|---|---|
| | Set | Cotton Free | Print Free | Glass | Steel | | |
| 1 | 4 | 8 | 14 | 20 | 16 | 20 | 48 |
| 2 | 2 | 5 | 14 | 18 | 16 | 20 | 48 |
| 3 | 4 | 8 | 14 | 16 | 16 | 20 | 67 |
| 4 | 4 | 8 | 15 | 14 | 16 | 20 | 168 |
| 5 | 5 | 14 | 20 | 18 | 12 | 20 | 51 |

The materials of the several samples constitute fast air-drying coating materials which do not require baking in order to attain a reasonable degree of hardness.

EXAMPLE II

The glycidyl polyether ester of this example was prepared in accordance with the provisions of Example D. A series of samples of this material were then formulated:

Sample 1

| | Parts by weight |
|---|---|
| Glycidyl polyether ester (D) | 1029 |
| Vinyl acetate | 600 |
| Vinyl chloride | 600 |
| Benzoyl peroxide | 40 |

The mixture was heated for 8 hours at 167° F. The excess monomers were distilled and xylene was added to provide a product which at 37.6 percent by weight solids, had a viscosity of A and a Gardner color of 5 to 6. The polymer contained 34 percent combined monomers.

Sample 2

In this sample 1010 parts by weight of the glycidyl polyether ester (D) was mixed with 600 parts by weight of vinyl acetate, 600 parts by weight of vinyl chloride and 40 parts by weight of benzoyl peroxide. The mixture was heated for 2 hours at 145° F. and for 6 hours at 167° F. The excess monomers were distilled to provide a product which when diluted to a solids content of 48 percent in xylene had a viscosity of F to G and a Gardner color of 5 to 6. The combined monomer content of the polymer was 41.2 percent.

Sample 3

In this sample the composition was as follows:

| | Parts by weight |
|---|---|
| Glycidyl polyether (D) | 1029 |
| Vinyl acetate | 600 |
| Vinyl chloride | 600 |
| Benzoyl peroxide | 50 |

This mixture was heated at 145° F. for 2 hours at 167° F. for 6 hours. The excess monomers were distilled, and the product, when diluted to a solids content of 49.6 percent by weight in xylene, had a viscosity of K to L and a Gardner color of 6 to 7. The combined monomer content of the interpolymer was 45.5 percent.

Sample 4

The composition in this instance was:

| | Parts by weight |
|---|---|
| Glycidyl polyether ester (D) | 856 |
| Vinyl acetate | 750 |
| Vinyl chloride | 750 |
| Benzoyl peroxide | 40 |

The interpolymerization scheduled was 8 hours at 167° F. The excess monomers were distilled and the product was diluted to a solids content of 45.2 percent by weight in xylene. The solution had a viscosity of G and a Gardner color of 5 to 6. The combined monomer content of the polymer was 46.1 percent.

Sample 5

The composition in this instance was the same as in Sample IV except that 50 parts by weight of benzoyl peroxide were employed as a catalyst. The time temperature schedule of polymerization was the same as for Samples II and III of this example. The product when freed of excess monomer and diluted with xylene to a solids content of 52.5, had a viscosity of W and a Gardner color of 5 to 6. The combined monomer content of the polymer was 59.6 percent.

Tests of these samples were made upon panels of glass and steel. The cures of these were effected by baking for 30 minutes at 300° F. The films were tested for Sward hardness, flexibility and alkali resistance and the results of these tests are hereby tabulated as follows:

| Sample | Hardness | | Flexibility, Percent | Alkali Resistance, Hours |
|---|---|---|---|---|
| | Glass | Steel | | |
| 1 | 2 | 4 | 20 | 32 |
| 2 | 6 | 10 | 20 | 79¼ |
| 3 | 10 | 22 | 20 | 67 |
| 4 | 12 | 12 | 20 | 55 |
| 5 | 20 | 18 | 20 | 48 |

The materials of these samples were rapid drying coating materials suitable for forming films upon various materials such as wood, iron, stone and the like.

EXAMPLE III

The glycidyl polyether ester of this example was the same as that prepared in accordance with the provisions of Example E. The following series of samples were prepared:

Sample 1

This sample comprised:

| | Parts by weight |
|---|---|
| Glycidyl polyether ester (E) | 695 |
| Vinyl acetate | 800 |
| Vinyl chloride | 800 |
| Benzoyl peroxide | 30 |
| Xylene | 105 |

The polymerization schedule was 9 hours at 167° F. The product when freed of excess monomer and diluted to a solids content of 51.2 percent by weight in xylene, had a viscosity of W to X and a Gardner color of 6. The combined monomer content of the interpolymer was 63.8 percent by weight.

Sample 2

This sample comprised:

| | Parts by weight |
|---|---|
| Glycidyl polyether ester (E) | 695 |
| Vinyl acetate | 800 |
| Vinyl chloride | 800 |
| Benzoyl peroxide | 40 |
| Xylene | 105 |

The polymerization schedule was 8 hours at 167° F. The product when freed of excess monomer and diluted to a solids content of 50 percent by weight in xylene had a viscosity of V to W and a Gardner color of 5 to 6. The combined monomer content of the interpolymer was 67.3 percent.

Sample 3

This sample was of the composition:

| | Parts by weight |
|---|---|
| Glycidyl polyether ester (E) | 695 |
| Vinyl acetate | 800 |
| Vinyl chloride | 800 |
| Benzoyl peroxide | 40 |
| Xylene | 105 |

The polymerization schedule was 9 hours at 167° F. The product when freed of excess monomers and diluted with xylene to a solids content of 55.4 percent by weight had a viscosity of Z to $Z_1$ and the color was 6 to 7. The combined monomer content of the interpolymer was 69 percent by weight.

Films of these samples were spread upon iron and steel as in the preceding examples and were air cured to provide protective films. The films from Sample 1 had a Sward hardness upon glass of 16 and upon steel of 14. Sample 2 provided films which set in 4 minutes, were cotton free in 13 minutes and print free in 40 minutes. The Sward hardness on glass was 14 and upon steel was 18. The flexibility was 20 percent.

The films from Sample 3 were cured by baking for 30 minutes at 265° F. The films were of a Sward hardness upon both glass and steel of 26. The alkali resistance was 36 hours.

EXAMPLE IV

The glycidyl polyether ester component of this example was the same as that disclosed in Example C. The composition of the interpolymerizable mixture was as follows:

| | Parts by weight |
|---|---|
| Glycidyl polyether ester (C) | 20 |
| Vinyl acetate | 20 |
| Vinyl chloride | 20 |
| Benzoyl peroxide | 1 |

The polymerization schedule was 15 hours at 75° C. The product when freed of excess monomers and diluted to a solids content of 48.4 percent by weight in xylene, had a viscosity of Y to Z and a color of 11 to 12 on the Gardner scale. Glass and steel panels were coated with material and subjected to the preceding tests with the following results:

| | | |
|---|---|---|
| Set | minutes | 4 |
| Cotton free | do | 8 |
| Print free | do | 15 |
| Sward hardness on glass | | 14 |
| Sward hardness on steel | | 10 |
| Flexibility | percent | 18 |
| Alkali resistance | hours | 172 |

EXAMPLE V

The glycidyl polyether ester of this example corresponds to that of Example B previously described. The interpolymerizable mixture was of the composition:

| | Parts by weight |
|---|---|
| Glycidyl polyether ester (B) | 11 |
| Vinyl acetate | 20 |
| Vinyl chloride | 20 |
| Benzoyl peroxide | 1 |

The polymerization schedule was 15 hours at 75° C. The product when freed of excess monomer was diluted with xylene to a solids content of 46.1 percent by weight and had a viscosity of O to V and a color of 11. The combined monomer content of the interpolymer was 65.8 percent by weight.

Films of this material upon test panels of glass and steel were air dried and the tests previously described were conducted in connection therewith. The results are as follows:

| | | |
|---|---|---|
| Set | minutes | 4 |
| Cotton free | do | 8 |
| Print free | do | 15 |
| Sward hardness on glass | | 14 |
| Sward hardness on steel | | 10 |
| Alkali resistance | hours | 24 |

EXAMPLE VI

The glycidyl polyether ester of this example was the same as that of Example F. The interpolymerizable mixture was of the following composition:

| | Parts by weight |
|---|---|
| Glycidyl polyether ester (F) | 645 |
| Vinyl acetate | 700 |
| Vinyl chloride | 1300 |
| Benzoyl peroxide | 37.5 |
| Stabilizer (RN 34) | 12.5 |

The polymerization schedule was 8 hours at 167° F. The material was freed of excess monomers and was diluted to a solids content of 50.6 percent by weight at which it had a viscosity of W to X and the Gardner color was 5 to 6. The combined monomer content of the polymer was 58.9 percent by weight.

The interpolymer product was tested upon panels of glass and steel with the following results:

| | | |
|---|---|---|
| Set | minutes | 8 |
| Cotton free | do | 16 |
| Print free | do | 21 |
| Sward hardness on glass | | 16 |
| Sward hardness on steel | | 16 |
| Flexibility | percent | 20 |
| Alkali resistance | hours | 12 |

EXAMPLE VII

The tests in this example constitute a control illustrating the advantages in curing speed attained in the preceding examples as compared with a conventional interpolymer comprising a glycidyl polyether ester and styrene. The glycidyl polyether ester of this example was the same as that disclosed in Example G preceding. The composition comprised:

| | Parts by weight |
|---|---|
| Glycidyl polyether ester (G) | 130 |
| Styrene | 39 |
| Ditertiary butyl peroxide | 1 |

The polymerization schedule was 5 hours under reflux in order to prevent the escape of reactants. The product when diluted with xylene to a solids of 50 percent by weight, had a viscosity of H and a Gardner color of 8. Films of the material upon glass and steel test panels were subjected to tests as in the preceding examples, with the following results:

| | | |
|---|---|---|
| Set | minutes | 10 |
| Cotton free | do | 25 |
| Print free | do | 60 |
| Sward hardness on glass | | 22 |
| Sward hardness on steel | | 18 |
| Flexibility | percent | 20 |
| Alkali resistance | hours | 6 |

It will be apparent that as compared with most of the materials of Examples I through VI this material cured relatively slowly and the films, although of good hardness, were low in alkali resistance.

EXAMPLE VIII

This example illustrates a composition suitable for use as an enamel for coating various surfaces such as wood, metal, stone or the like. The interpolymer product constituting the vehicle was of the composition:

| | Parts by weight |
|---|---|
| Glycidyl polyether ester (E) | 695 |
| Vinyl acetate | 800 |
| Vinyl chloride | 800 |
| Benzoyl peroxide | 40 |
| Xylene | 105 |

This mixture was interpolymerized for 8 hours at 167° F. to provide a product which when diluted in xylene to a solids content of 50 percent by weight had a viscosity of V to W and a Gardner color of 5 to 6.

The interpolymer resin was then made up with titanium dioxide to provide a composition of 55.8 percent by weight of interpolymer and 44.2 percent by weight of titanium dioxide. The mixture was diluted with xylene to provide a composition which was of a solids content of 59.4 percent by weight and 40.6 percent by weight of solvent. This composition when subjected to a viscosity test in a Ford cup had a consistency of 20 seconds. Films of this material set in 7 minutes, were cotton free in 12 minutes, were print free in 13 minutes (under air drying conditions). This constitutes a very fast drying material.

In the preceding examples, unless otherwise indicated, it may be assumed that drying of the films was at atmospheric temperatures.

EXAMPLE IX

Sample 1

A charge comprising 1200 grams of glycidyl polyether which was the same as that of Example A and 1200 grams of fatty acids of soybean oil were introduced into a flask as in Example I. The mixture was esterified at 200° C. until an acid value of less than 15 on the Gardner-Holdt scale was obtained. The analysis of this ester product was as follows:

| | |
|---|---|
| Solids content percent by weight | 77.5 |
| Viscosity | X+ |
| Gardner color | 10+ |
| Acid value | 6.67 |

An interpolymerizable composition was prepared by diluting the above polyester with xylene to a solids content of 50 percent by weight and adding monomers. The composition comprised:

| | Grams |
|---|---|
| Above ester product | 15 |
| Vinyl chloride | 15 |
| Methyl acrylate | 15 |
| Benzoyl peroxide | 0.75 |

The foregoing charge was introduced into a bomb and shaken in a water bath at 80° C. for 15 to 16 hours. The sample was then rinsed into a flask with xylene and the excess of monomer and some of the xylene were distilled off to provide a solution of interpolymers in xylene. The percent of combined monomer, and percent of conversion was calculated from the solids of this solution as follows:

| | Percent |
|---|---|
| Solids | 47.5 |
| Alkyd | 24.1 |
| Combined monomer | 75.9 |

The viscosity of the solution was Y, the Gardner color was 10+ and the percent conversion was 79.0.

This material was spread on a glass panel and baked at 350° F. for 30 minutes. The properties of the resultant films were as follows:

| | |
|---|---|
| Sward hardness | 36 |
| Mar resistance | Good |
| Flexibility | Good |

Sample 2

This is a repetition of Sample 1 above but with ethyl acrylate in place of methyl acrylate. The analysis of the product was as follows:

| | | |
|---|---|---|
| Solids | percent by weight | 56.1 |
| Alkyd | do | 25.2 |
| Combined monomer | do | 74.8 |
| Viscosity | | Z |
| Gardner color | | N+ |
| Conversion | percent | 72.5 |

Films of this material were spread on glass and baked at 350° F. for 30 minutes to provide flexible coatings which were softer than those of the preceding sample.

Sample 3

The sample is the same as Sample 1 except that an equal weight of isobutyl acrylate is substituted for methyl acrylate.

The properties of the interpolymer are as follows:

| | | |
|---|---|---|
| Solids | percent by weight | 54.6 |
| Alkyd | do | 23.6 |
| Combined monomer | do | 76.4 |
| Viscosity | | Y |
| Gardner color | | 11+ |
| Conversion | percent by weight | 81.1 |

A glass panel was coated with this material and baked at 350° F. for 30 minutes to provide films which were flexible and of light yellow color.

EXAMPLE X

This example is similar to Example IX except that the ethylenically unsaturated esters were of methacrylic acid. The proportions and procedures in preparing the interpolymer composition were in other respect identical with those of the foregoing example. A series of samples was prepared as follows:

Sample 1

This sample comprised methyl methacrylate as the ester monomer. The composition was of the following characteristics:

| | |
|---|---|
| Solids _____percent by weight__ | 53.0 |
| Alkyd _____do____ | 27.0 |
| Combined monomer _____do____ | 73.0 |
| Conversion _____do____ | 67.8 |
| Viscosity _____ | $Z_2+$ |
| Gardner color _____ | 14+ |

Glass panels coated with this material and baked at 300° F. for 30 minutes provided films of a Sward hardness of 18, and of good mar resistance.

Sample 2

The ester monomer in this sample was ethyl methacrylate. The characteristics of the interpolymer were as follows:

| | |
|---|---|
| Solids _____percent by weight__ | 53.8 |
| Alkyd _____do____ | 25.3 |
| Combined monomer _____do____ | 74.7 |
| Conversion _____do____ | 73.7 |
| Viscosity _____ | Y |
| Gardner color _____ | 15+ |

Films of this material on glass, when baked at 350° F. for 30 minutes were hard and mar resistant.

Sample 3

In this sample, n-butyl methacrylate was employed as an ester monomer. The characteristics of the interpolymer were:

| | |
|---|---|
| Solids _____percent by weight__ | 60.4 |
| Alkyd _____do____ | 25.6 |
| Combined monomer _____do____ | 74.4 |
| Conversion _____do____ | 72.7 |
| Viscosity _____ | $Z_1$ |
| Gardner color _____ | 15+ |

Glass panels were coated with this material and baked at 350° F. for 30 minutes to provide films of a Sward hardness of 26.

EXAMPLE XI

In this example, vinylidene chloride was substituted for methylacrylate in Example IX, run 1. The composition was otherwise the same. The time-temperature schedule also corresponded to that of the said example and run. The interpolymer product had the following analysis:

| | |
|---|---|
| Solids _____percent by weight__ | 43.6 |
| Alkyd content _____do____ | 56.8 |
| Combined monomer _____do____ | 43.2 |
| Viscosity _____ | A |
| Gardner color _____ | 15+ |

Glass panels were coated with this material and baked for 30 minutes at 350° F. to provide yellow but flexible films.

EXAMPLE XII

This is again a repetition of Example IX, run 1, in proportions and in procedure except that methyl acrylate was replaced by an equal weight of vinyl ethyl ether. The interpolymer product had the following characteristics:

| | |
|---|---|
| Solids _____percent by weight__ | 59.8 |
| Alkyd content _____do____ | 31.6 |
| Combined monomer _____do____ | 68.4 |
| Conversion _____do____ | 54 |
| Viscosity _____ | A+ |
| Gardner color _____ | 6+ |

Test panels of steel were coated with this interpolymer product baked for 1 hour at 350° F. The resultant films were of a Sward hardness of 18, flexible and of good mar resistance.

EXAMPLE XIII

In this example, the methylacrylate, of Example IX, run 1, was replaced by an equal weight of vinyl butyl ether and the mixture was interpolymerized as in the aforesaid run. The product was of the following characteristics:

| | |
|---|---|
| Solids content _____percent by weight__ | 59.7 |
| Alkyd content _____do____ | 34.7 |
| Combined monomer _____do____ | 65.3 |
| Conversion _____do____ | 47 |
| Viscosity _____ | B |
| Gardner color _____ | 11+ |

Films of this material on steel when baked at 350° F. for 30 minutes had a Sward hardness of 16, were mar resistant and flexible.

It is to be observed from the Examples I through XIII that the combined monomer content usually falls in a range of about 34 to about 76 percent by weight based upon the resin. Conversely, the amount of polyester in the resin falls in a range of about 76 percent to about 24 percent upon a like basis.

The interpolymers herein disclosed are valuable for protectively and for decoratively coating, iron, stone and many other materials.

The forms of the invention herein described are by way of illustration. It will be apparent to those skilled in the art that numerous modifications may be made therein without departure from the spirit of the invention or the scope of the appended claims.

I claim:

1. A resin which is soluble in xylene and which is an interpolymer of (A) vinyl chloride (B) an ester of a class consisting of:

| | |
|---|---|
| Vinyl acetate | Isobutyl acrylate |
| Ethyl acrylate | Vinyl propionate |
| Methyl acrylate | Ethyl methacrylate |
| Butyl acrylate | Vinyl butyrate |
| Methyl methacrylate | Vinyl isobutyrate |
| Propyl methacrylate | Allyl acetate | and (C) an ester of a resinous glycidyl polyether of a polyhydric phenol and a drying oil fatty acid containing 18 carbon atoms and a plurality of double bonds in the hydrocarbon chain; the vinyl chloride constituting 5 to 80 percent by weight of the mixture of said vinyl chloride and said ester, the combination of the vinyl chloride and the ester comprising about 34 to about 76 percent of said resin.

2. A resin which is soluble in xylene and which is an interpolymer of an ester of (1) a resinous epoxy polyether of epichlorohydrin and p,p'-isopropylidenediphenol and (2) a drying fatty acid, the rest of the interpolymer consisting essentially of monomeric units which are about 5 to 80 percent of vinyl chloride, the rest of the monomeric units being of a class consisting of:

| | |
|---|---|
| Vinyl acetate | Ethyl acrylate |
| Vinyl butyrate | Ethyl methacrylate |
| Vinyl isobutyrate | Butyl acrylate |
| Vinyl propionate | Isobutyl acrylate |
| Allyl acetate | Methyl methacrylate |
| Methyl acrylate | Propyl methacrylate | the monomeric units comprising about 34 to about 76 percent of said resin.

3. A resin which is soluble in xylene and which is an interpolymer of an ester of (1) a resinous epoxy polyether of epichlorohydrin and p,p'-isopropylidenediphenol and (2) an acid of a class consisting of soya oil and linseed oil acids, the rest of the interpolymer consisting essentially of monomeric units which are 5 to 80 percent vinyl chloride, the rest of said units being vinyl acetate, the monomeric units being present in an amount of about 34 to about 76 percent of said resin.

4. An interpolymer resin which is soluble in xylene and which is of an interpolymer of an ester of a resinous epoxy polyether of epichlorohydrin and p,p'-isopropylidenediphenol and an acid of a class consisting of soya oil acids and linseed oil acids, the rest of the interpolymer consisting essentially of monomeric units which are 5 to 80 percent vinyl chloride the rest of the monomeric units being of a class consisting of:

| | |
|---|---|
| Vinyl acetate | Ethyl acrylate |
| Vinyl propionate | Butyl acrylate |
| Vinyl butyrate | Isobutyl acrylate |
| Vinyl isobutyrate | Methyl methacrylate |
| Allyl acetate | Ethyl methacrylate |
| Methyl acrylate | Propyl methacrylate | the monomeric units constituting about 34 to about 76 percent of said resin.

5. In a method of forming a resin which is soluble in xylene and which is an interpolymer of about 10 percent to about 46 percent of an ester of a resinous epoxy polyether of epichlorohydrin and p,p'-isopropylidenediphenol and an acid of a class consisting of soya oil acids and linseed oil acids the rest of the interpolymer consisting essentially of monomeric units which are about 5 to 80 percent vinyl chloride, the rest of the units being vinyl acetate; the step of heating the mixture of the foregoing components of said resin under pressure and in the presence of an organic peroxide catalyst of interpolymerization to the temperature of interpolymerization until said interpolymer is formed.

References Cited in the file of this patent

UNITED STATES PATENTS 2,689,834      McNabb _____ Sept. 21, 1954